Dec. 23, 1952     J. B. TEMPLETON     2,622,925
SPRINKLING SYSTEM FOR LAWNS AND THE LIKE
Filed Dec. 30, 1948     3 Sheets-Sheet 1
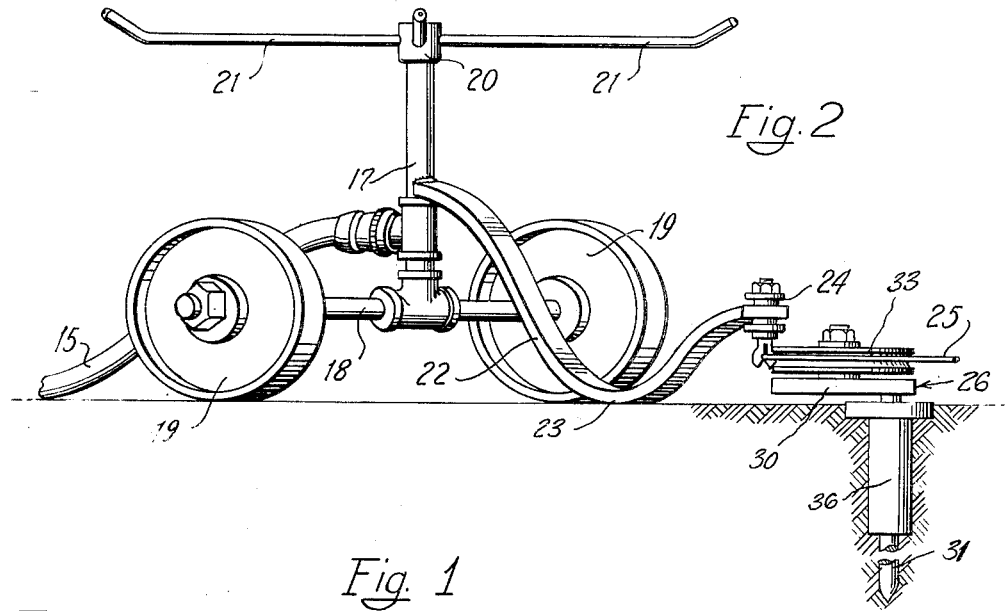
Fig. 2
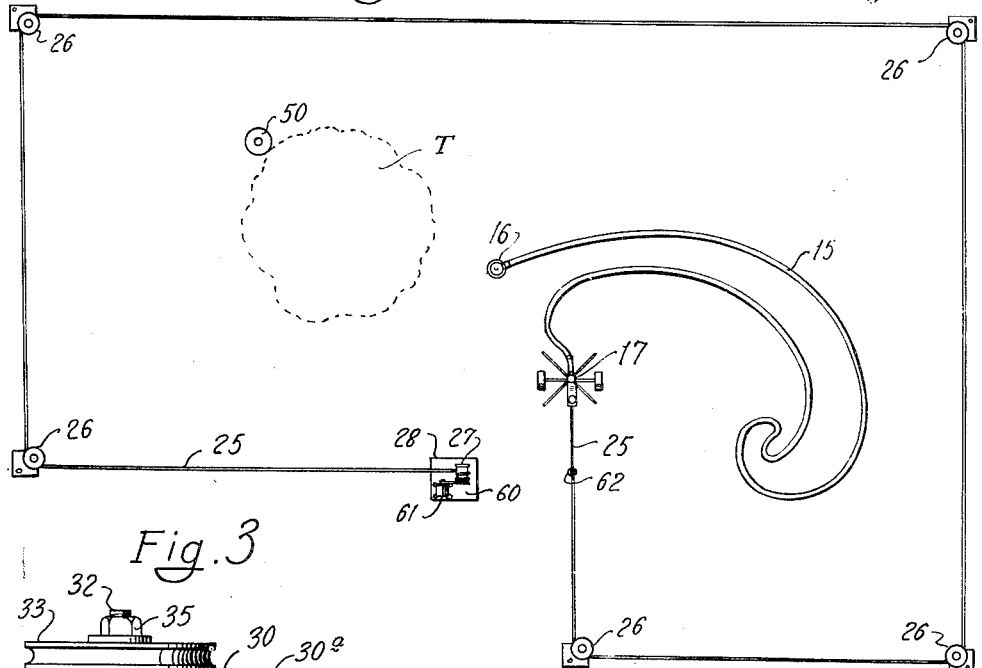
Fig. 1
Fig. 3
John B. Templeton
INVENTOR.
BY *Hastings Ackley*
ATTORNEY Dec. 23, 1952         J. B. TEMPLETON         2,622,925
SPRINKLING SYSTEM FOR LAWNS AND THE LIKE
Filed Dec. 30, 1948.         3 Sheets—Sheet 2
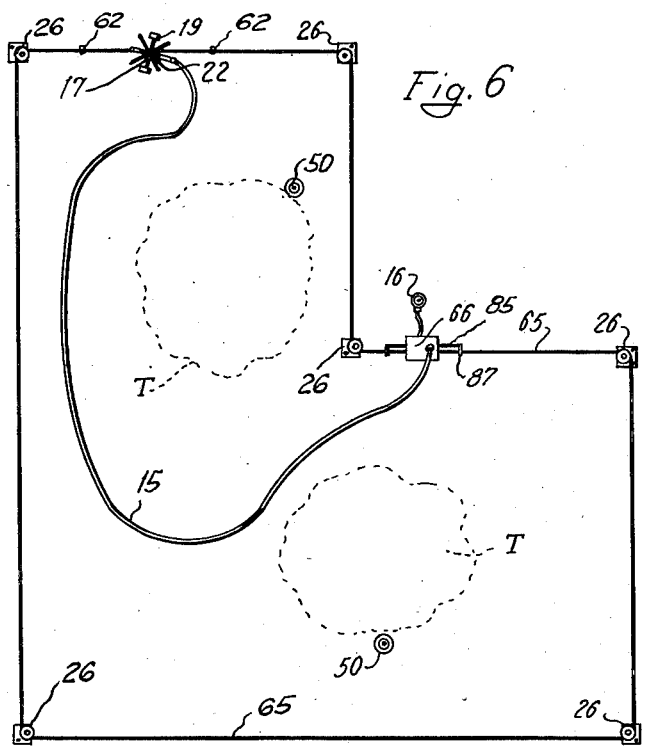
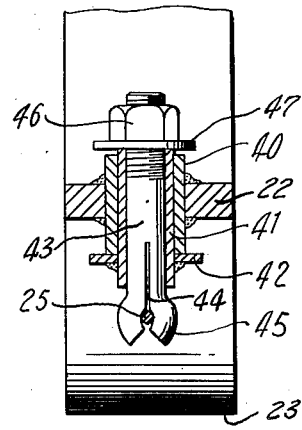
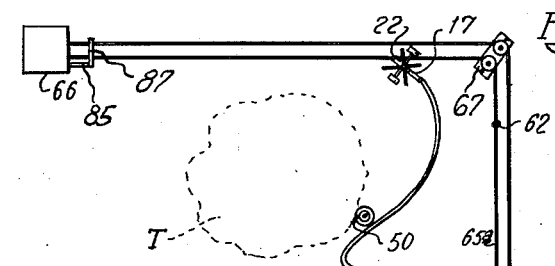
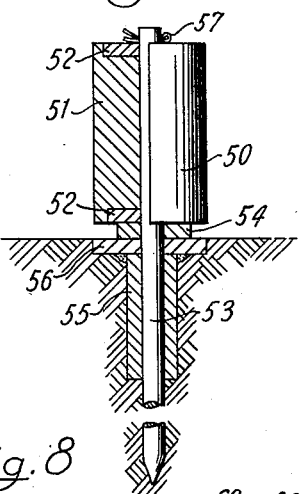
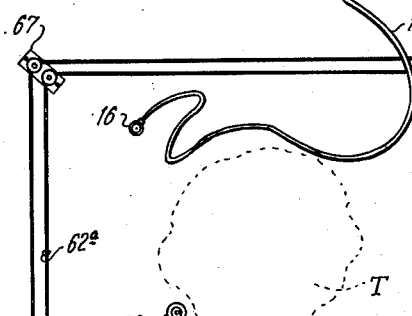
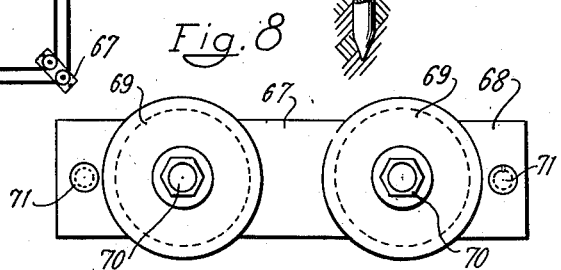
John B. Templeton
INVENTOR.
BY
ATTORNEY Dec. 23, 1952 J. B. TEMPLETON 2,622,925
SPRINKLING SYSTEM FOR LAWNS AND THE LIKE
Filed Dec. 30, 1948 3 Sheets-Sheet 3
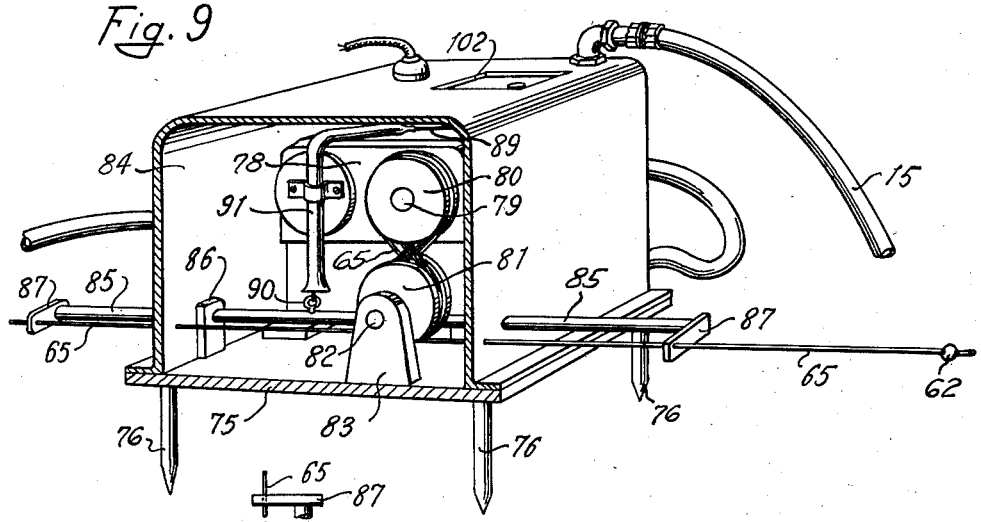
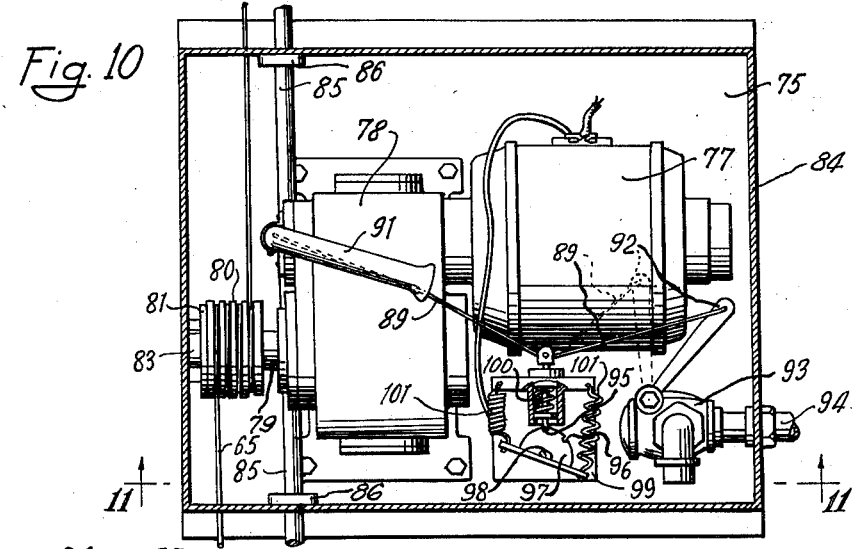
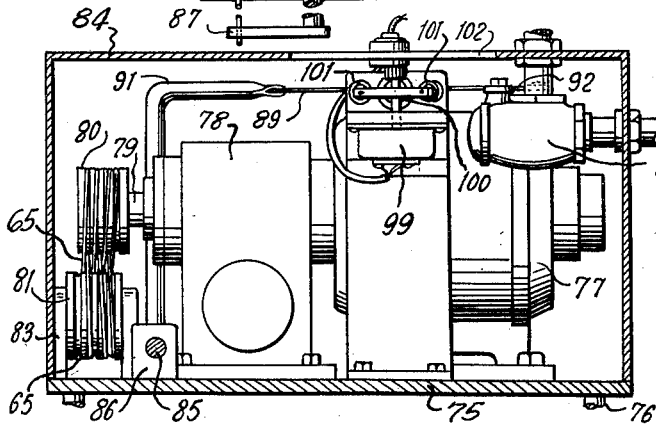
John B. Templeton
INVENTOR.
BY *Hastings Ackley*
ATTORNEY Patented Dec. 23, 1952

2,622,925

UNITED STATES PATENT OFFICE 2,622,925

SPRINKLING SYSTEM FOR LAWNS AND THE LIKE

John B. Templeton, Dallas, Tex.

Application December 30, 1948, Serial No. 68,147

12 Claims. (Cl. 299—47)

This invention relates to new and useful improvements in sprinkling systems for lawns and the like.

It is one object of the invention to provide a sprinkling system and apparatus which may be used to selectively sprinkle a lawn automatically, covering a selected area of the lawn.

Another object of the invention is to provide a sprinkling system and apparatus having power means for drawing a sprinkler along a preselected path for automatically sprinkling the lawn or the like, and wherein the path of the sprinkler may be altered or varied to meet different conditions of need.

An important object of the invention is to provide in a sprinkling system of the character described novel means for controlling the path of the sprinkler over the lawn.

Another object of the invention is to provide in a system and apparatus for sprinkling lawns means for automatically stopping the movement of the sprinkler and cutting off the flow of water therethrough.

A particular object of the invention is to provide a sprinkling system of the character described wherein the sprinkler may be reversed in direction and drawn back over the selected path to repeat the irrigation of the plot.

A further object of the invention is to provide in a sprinkling system of the character described a power drive mechanism for moving the sprinkler along a selected path at a uniform rate of speed, whereby the plot being irrigated receives a uniform predetermined desired amount of water.

A still further object of the invention is to provide a drive mechanism utilizing a pull cable and selectively placeable guide blocks for the cable, whereby the path over which the sprinkler is drawn by the cable may be varied to meet different conditions of need or use.

Another object of the invention is to provide in a sprinkling system of the character described a drive mechanism having a pair of multiple-grooved drive pulleys over which the pull cable is laced in alternate grooves to increase the frictional pull on the cable and to prevent tangling or overlapping of the cable on the pulleys as the cable is drawn therethrough.

Still another object of the invention is to provide a sprinkling system and apparatus of the character described which is adapted for use without additional piping, tracks or the like, and which utilizes the usual or conventional water hose and sprinkler to attain the desired results.

Additional objects and advantages of the invention will readily be apparent from the reading of the following description of a device constructed in accordance with the invention, and reference to the accompanying drawings thereof, wherein:

Figure 1 is a schematic plan view of a sprinkling system constructed in accordance with the invention, Figure 2 is a perspective elevation of a sprinkler adapted for use in the invention showing the same passing one of the pull cable guide blocks controlling the path of movement of the sprinkler, Figure 3 is an enlarged view, partly in elevation and partly in section, of one of the pull cable guide blocks, Figure 4 is an enlarged transverse vertical sectional view taken through the connecting clamp by means of which the sprinkler is connected to the pull cable, Figure 5 is an enlarged view, partly in elevation and partly in section, of a guard roller for the water hose, Figure 6 is a schematic plan view of a modified form of the sprinkler system of the invention, Figure 7 is a schematic view of a still further modification of the sprinkler system, Figure 8 is an enlarged plan view of a double sheave guide block for use in the latter modification of the invention, Figure 9 is a view, partly in elevation and partly in section, of a preferred form of the power drawing mechanism of the invention, Figure 10 is an enlarged plan view of the drawing mechanism with the cover removed, and Figure 11 is a vertical longitudinal sectional view taken on the line 11—11 of Figure 10.

In the drawings, the numeral 15 designates a conventional flexible water hose made of rubber, synthetic rubber, plastic or the like, connected at one end to a conventional water hydrant or faucet 16 installed in the usual manner in the yard or other plot to be irrigated or sprinkled. The water supplied through the faucet travels through the hose to a sprinkler 17 mounted on an elongate axle 18 having ground wheels 19 rotatably mounted at its outer ends, whereby the sprinkler may be moved along the ground. While the sprinkler illustrated is the type having a rotatable head 20 with a plurality of spaced radially extending sprinkler arms or nozzles 21 carried by said head, it is believed manifest that any other suitable type of sprinkler may be used.

A draw bar or tongue 22 is connected at one end to the sprinkler and extends outwardly and downwardly therefrom to provide a slidable ground shoe section 23 which slides along the surface of the ground and holds the sprinkler upright. The forward end of the tongue is bent upwardly away from the ground and is provided with a coupling or connecting member 24 by means of which the sprinkler is connected to a draw or pull cable 25.

From the sprinkler, the cable is threaded around movable guide blocks 26 which are positioned at selected points in the lawn or other plot to be sprinkled or irrigated, and at its other end is wound onto a power driven reel 27 of a power draw unit 28 by means of which the cable is pulled around the path outlined by the guide blocks to draw the sprinkler and hose along the selected path to water or irrigate the lawn or other plot.

The guide pulley blocks 26 may be of any desired suitable form, but are preferably of the type best illustrated in Figure 3. Each guide block includes a flat base plate 30 having a ground pin 31 loosely extending through an opening 30a in said plate and adapted to be pressed or forced into the ground to provide a pivot for the plate. Spaced from the ground pin and directed upwardly from the opposite side of the plate is a pulley shaft 32 on which a sheave or pulley 33 is rotatably mounted, said sheave being spaced from the plate by a spacer block 34 and held in place on the shaft by means of a nut 35. It is also preferable that the ground pivot pin 31 be mounted in a sleeve member 36 which is pressed into the ground to provide a ready mount and support for the pin. The sleeve has an external annular flange 37 at its upper end which serves as a pivot plate and support for the base plate 30 of the guide block. The guide block may be removed from the sleeve by lifting upwardly to remove the pin from within the sleeve, whereupon the lawn may be mowed or other operations performed on the plot in which the sprinkling system is used.

Since the guide blocks 26 are pivotally mounted on the pins 31, it will be seen that such blocks may move to accommodate variations in the pulling force applied thereto by the cable 25, as well as movements of the line and sprinkler. The draw cable will pass readily around the groove of the pulley or sheave 33 as the cable is drawn inwardly by the reel 27 of the draw mechanism 28, and the connecting member 24 on the draw bar 22 of the sprinkler is so positioned that it will likewise follow the cable around the groove of the sheave.

The connecting member 24, as shown in Figure 4, includes a sleeve 40 which is secured by welding or otherwise in an opening in the outer end of the draw bar, and rotatably mounted in the sleeve is a bushing 41 having an annular flange 42 at its lower end and having its upper end projecting above the upper end of the sleeve. A cable clamping member 43 is slidably mounted in the bushing and has its lower end split to provide a transverse clamping recess 44 for receiving the cable 25. The lower exterior portion of the clamping member is preferably substantially spherical in configuration, as indicated at 45, whereby such portion of the member will readily track along the grooves in the pulleys or sheaves 33 of the guide block. A clamping nut 46 is threaded onto the upper end of the clamping member which projects upwardly above the upper end of the bushing 41 and a washer 47 surrounds the clamping member between the clamping nut and the upper end of the bushing, whereby the clamping member may be drawn upwardly in the bushing to press the split halves of the lower portion of the clamping member tightly around the cable. The washer 47 maintains the bushing 41 in rotatable position in the sleeve 40 to permit the clamping member and bushing to turn about their longitudinal vertical axis in said sleeve as the cable is drawn around the sheaves of the guide blocks.

As best shown in Figure 2, the length of the clamping member 43 is such that it is positioned in substantial horizontal alignment with the groove of the sheaves 33 of the guide blocks, whereby the forward end of the draw bar 22 of the sprinkler is drawn around the sheaves of the guide blocks with the cable 25 to accurately define the path of movement of the sprinkler.

It is preferable that protector or guard rollers 50 be positioned adjacent the trunks of trees T to prevent the hose 15 from binding or scraping against such tree trunks as the same is drawn along the ground after the sprinkler. The protector rollers include a roller block 51, preferably of wood or other suitable material, having bearing rings 52 provided at each end and rotatably mounted upon a pivot pin 53 which extends axially through the roller. A spacer bushing 54 is provided between the roller and the upper end of a ground sleeve 55 which is pressed into the ground to provide a support and guide for the pivot pin 53. The upper end of the ground sleeve is provided with an external annular flange 56 to serve as a bearing or support for the spacer bushing 54, whereby the roller is free to rotate on the pivot pin. The roller is retained on the pin by means of a key 57 or other suitable means.

The drawing mechanism 28 includes, in addition to the reel or spool 27 on which the cable is wound, a base member 60 and a power unit 61 operatively connected with the reel for driving the reel to wind the cable 25 thereupon. The power unit may be of any desired suitable type, but is preferably an electric motor having a speed reduction gear mechanism interposed between the drive shaft of the motor and the shaft of the reel or spool 27, whereby the speed of rotation of the reel may be accurately controlled to obtain the desired rate of movement of the sprinkler 17 along the selected path. This will provide for a uniform desired rate of sprinkling of the territory or area to be irrigated.

When the sprinkler has moved along the complete path defined by the guide blocks 26 and the cable 25, the power supplied by the draw mechanism 28 may be cut off and the supply of water through the faucet 16 may likewise be turned off to stop the operation of the mechanism. When it is desired to repeat the operation, the cable is unwound from the reel 27 and again threaded around the sheaves 33 of the guide blocks, whereupon the water may be turned on at the hydrant or faucet and the power unit may be re-energized to again draw the sprinkler along the selected path to repeat the sprinkling operation. Furthermore, it is believed manifest that automatic controls for cutting off the power supplied by the draw mechanism 28 and for simultaneously cutting off the water delivered through the hydrant 16 may likewise be provided. A trip member 62 may be secured on the cable 25 in advance of the sprinkler to actuate the automatic controls. A preferable form of drawing mechanism is hereinafter more fully described.

Modified forms of the invention are illustrated in Figures 6 and 7, wherein the draw or pull cable 65 forms a continuous loop, and the draw mechanism includes a reversible motor or power unit 66, whereby the sprinkler may be reversed along the path of travel without the necessity of unwinding and rethreading the cable as hereinbefore described.

In the form of the invention shown in Figure 6, the cable 65 is a continuous band which passes through the draw mechanism 66, illustrated more fully in Figures 9 through 11, and thence is directed in a continuous open loop path around guide blocks 26 of the same structure as those employed in the form of the invention first described. The sprinkler may thus be moved along the path defined by the cable 65 from one side of the draw mechanism to the other, and, by reversing the operation of the draw mechanism, the sprinkler may then be pulled back along the same path.

In the form of the invention shown in Figure 7, the pull cable 65a is directed in parallel sections along a circuitous path defined by double-sheave guide blocks 67, shown in detail in Figure 8, along which the cable sections extend parallel to each other through the desired path defined by the double-sheave guide blocks to a single sheave guide block 26 at the extreme outer end of the path. Otherwise, the operation of this form is the same as that of the form of Figure 6.

The double-sheave guide blocks 67 include an elongate rectangular base block 68 having spaced sheaves or pulleys 69 mounted thereon on shafts 70 similar to the shafts 32 of the form first described. At each end of the base block 68 is mounted an anchoring pin 71 which extends downwardly through an opening in the end of the block similarly to the ground pin 31 of the guide blocks 26, whereby the double-sheave blocks may be pivotally anchored in the desired position on the lawn or other plot being irrigated. If desired, ground sleeves 36 having external annular flanges 37 at their upper ends may be pressed in the ground for receiving the ground pins 71, whereby the double-sheave blocks may be removed from the ground to permit mowing or other treatment of the plot on which the sprinkling system is installed.

Also, guard or protector rollers 50 may be positioned adjacent trees T to prevent the hose from dragging against the trunks of the trees and facilitate movement of such hose along after the sprinkler.

The drawing mechanism preferred for use in the sprinkler systems of the invention is clearly illustrated in Figures 9 through 11, and includes a base plate 75 having ground pins 76 extending through openings in said plate for anchoring the mechanism in place on the lawn. An electric motor 77 having a gear reduction drive 78 connected with its drive shaft is mounted on the base plate, and the power shaft 79 from the gear reduction drive has a multiple-groove drive pulley 80 affixed thereon. Spaced below and parallel to the drive pulley 80 is a similar multiple-groove idler pulley 81 which is rotatable on a shaft 82 carried in bearing supports 83 mounted on the base plate. The grooves of the idler pulley 81 are offset one-half the width of the grooves of the drive pulley, whereby the draw cable 65 may be threaded under the first groove in the idler pulley and directed upwardly over said pulley and to the opposite side of the first groove of the drive pulley 80, thence around said first groove of the drive pulley and under said pulley to the opposite side of the second groove of the idler pulley. The cable is thus laced around successive grooves in the idler pulley and the drive pulley and thence outwardly from the idler pulley through openings in the cover 84 for the draw mechanism.

This lacing of the cable around the successive grooves of the drive pulley and idler pulley provides for an amplified area of contact of the cable with said pulleys to increase the frictional engagement of the cables with the pulleys, and provides sufficient force for drawing the sprinkler and the hose along the selected path. Furthermore, the manner in which the cable is laced over the drive pulley and idler pulley prevents tangling or other interference with the movement of the cable past said pulleys and through the draw mechanism.

An elongate trip bar 85 is slidably mounted in bearing supports 86 carried by the base plate and extends outwardly through the cover 84 parallel to the draw cable 65, as clearly shown in Figure 9. At its outer ends this trip rod is provided with arms 87 having openings therein through which the draw cable is slidable. The arms 87 are so disposed as to be engageable by a trip ball 62 affixed on the draw cable in advance of the sprinkler 17 to provide for automatically stopping operation of the sprinkler system. Such stopping of the system is accomplished by means of a flexible cable 89 which is connected at one end to an eye member 90 affixed substantially centrally of the trip bar or rod 85. The cable extends upwardly through an elongate L-shaped guide sleeve 91 to the lever arm 92 of a water cut-off valve 93 carried by the base and cover of the draw mechanism. The cut-off valve is provided with an outlet connection adapted to have a hose 15 connected thereto and is also provided with an inlet connection 94 by means of which the valve may be connected to a faucet for supplying water to the hose.

It will be seen, therefore, that when the trip ball 62 engages the trip arm 87 of the trip rod 85, the rod will be moved longitudinally with the ball by the force exerted on the cable by the drive and idler pulleys driven by the motor 77. Such longitudinal movement of the trip bar will pull the flexible cable 87 downwardly through the guide sleeve or tube 91 and will thus swing the lever arm 92 of the water cut-off valve to a position closing said valve. This will cut off the flow of water through the hose and to the sprinkler. When the lever arm is moved to a closed position, the continued movement of the trip rod further pulls the cable 87 to cause said cable to pull a spring-pressed latch pin 95 out of a notch 96 in a latch plate 97 mounted on the operating shaft 98 of an electric reversing switch 99, which holds said switch in circuit closing position. The reversing switch controls the direction of rotation of the electric motor 77. A strong compression latch spring 100 mounted on the latch pin 95 urges said pin toward the latch plate 97, and this latch spring is sufficiently strong to prevent movement of the latch pin until the valve lever 92 has been moved to the closed position. When the pin is released from the notch in the latch plate 97, springs 101 attached to the lever arms extending outwardly from said latch plate will move the latch plate to the neutral cut-off position, whereby the electric circuit providing for delivery of electric power to the motor is broken and the motor ceases to turn. When the power to the motor is cut off, the cable will no longer move and the entire sprinkler system is rendered inoperative. Thus, the water supply is first cut off and the electric power to the motor is then cut off.

The reversing switch 99 may be of any well-known conventional type which has two positions, by means of which the direction of rotation of the motor may be reversed. The latch plate 97 is provided with notches 96 for holding the switch in the desired contact or circuit closing position. An opening 102 is provided in the upper portion of the cover 84 for the draw mechanism, whereby the operator may open the water valve and may turn the switch in either direction to establish the electrical circuit through the motor and start movement of the cable in the direction desired.

When the trip ball member 62 engages the trip arm of the trip bar 85 to move the valve lever 92 of the water cut-off valve into position to lift the spring pressed pin 95 out of the notches in the latch plate, the springs 101 will move the latch plate and the operating shaft of electrical switch 99 to the open circuit position to cut off flow of electricity to the motor.

Manifestly, if desired, an electrically controlled solenoid-type water valve may be provided instead of the lever controlled valve previously described. The solenoid would hold the water valve open so long as electric current is supplied to the solenoid, and would permit the valve to close when the electric circuit is open to cut off the supply of current to the solenoid. In such event it would only be necessary to trip a single switch to cut off the delivery of electric power to both the solenoid-type valve and the electric motor, whereupon the valve would close and the motor would be stopped to completely stop operation of the sprinkler system.

If desired, a second trip ball 62a may be secured to the cable 65a of the form of Figure 7 at a point spaced substantially equally along the cable from the trip ball 62 in advance of the sprinkler. In this manner the sprinkler may be stopped at either end of the loop formed by the draw cable. Or, if desired, the second trip ball 62a may be positioned at any other point along the cable of this or the other forms to stop the sprinkler at any desired point along the path selected for movement of the sprinkler. Obviously, if the second trip ball 62a is omitted, the sprinkler may travel the complete length of the cable from one side of the draw mechanism 66 to the other side of such draw mechanism, and will be stopped only when it has travelled completely along such path and the trip ball 62 engages the trip arms 87 on the trip bar to shut off the electric power and cut off the flow of water to the sprinkler. It is believed that it will readily be seen that the pull cable may both enter and leave the draw mechanism on the same side, and that both sections of the pull cable may be threaded through spaced openings in a single arm 87 on the end of the trip bar 85, whereby the draw mechanism may be used in the form of the invention shown in Figure 7 as well as the form of Figure 6.

It will also readily be seen that more than one sprinkler may be connected to the pull cable if desired. One such arrangement would provide for a sprinkler to be attached to the cable closely adjacent the draw mechanism 66, and a second sprinkler to be clamped to the cable at the extreme outer end of the loop. Thus, when the cable is moved by the draw mechanism, each of the sprinklers would travel the complete pre-selected path, one being drawn outwardly from the draw mechanism and the other inwardly toward such draw mechanism. Of course, other arrangements of the sprinklers on the cable may be used, and in each case the sprinklers may be moved back and forth along the path, if desired.

From the foregoing, it is believed manifest that a sprinkling system and apparatus has been disclosed which may be used to selectively sprinkle a lawn automatically, covering a selected area of the lawn or other plot to be irrigated, and providing for movement of the sprinkler along such selected path at a uniform rate of speed whereby the plot being irrigated receives a uniform predetermined desired amount of water. Also, it is believed readily apparent that the sprinkler system has been provided with an improved novel means for controlling the path of the sprinkler over the plot to be irrigated, and more particularly that such means may be altered or moved in position to vary the pre-selected path along which the sprinkler is moved.

Furthermore, improved draw means for moving the sprinkler along the selected path has been provided, said draw means also being provided with an automatic cut-off mechanism for stopping the movement of the sprinkler and cutting off the flow of water therethrough. Likewise, the draw means is provided with an improved pulley drive mechanism for moving the draw cable, said drive mechanism including the pair of multiple-groove pulleys over which the pull cable is laced in alternate grooves to increase the frictional grip on the cable and to prevent tangling or overlapping of the cable on the pulleys as the cable is moved therepast. It is also believed manifest that a sprinkler system has been provided in which the sprinkler may be moved along a selected path and then moved back over the same path or a slightly different path to repeat the irrigation of the plot being watered.

It is further believed manifest that an improved sprinkling system and apparatus has been described which is particularly adapted for use without additional piping, tracks or the like, and which utilizes the usual or conventional water hose sprinkler to attain the desired result. This arrangement provides an economical substantially universally adaptable sprinkler system which may be readily and economically installed by the user on substantially any type of plot to be irrigated.

The foregoing description of the invention is explanatory only, and changes in the details of the construction illustrated may be made by those skilled in the art, within the scope of the appended claims, without departing from the spirit of the invention.

What I claim and desire to secure by Letters Patent is:

1. A sprinkler system including, a movable sprinkler, an elongate flexible water conductor connecting said sprinkler with a source of water supply, an elongate flexible cable, means secured to said cable and connecting the sprinkler to the cable, a power unit independent of the water supply for moving the cable to move the sprinkler, and a plurality of guide blocks selectively disposed at separated points in a plot to be irrigated for receiving and guiding the cable to define a selected irregular path of travel for the sprinkler, said connecting means being movable with the cable about the guide blocks, whereby when the power unit moves the cable the sprinkler is moved along said selected path for irrigating the plot traversed by said path.

2. A sprinkler system of the character set forth in claim 1 wherein, vertically extending guard means rigidly secured adjacent trees or the like are provided for preventing the flexible water conductor from dragging against trees and the like as said conductor is moved behind the sprinkler.

3. A sprinkler system of the character set forth in claim 1 wherein, the guide blocks are removably secured in place, whereby the path of travel of the sprinkler may be altered as desired.

4. A sprinkler system of the character set forth in claim 1 wherein, automatic cut-off means is provided at the power unit for cutting off the application of power to the cable and cutting off flow of water through the flexible conductor when said sprinkler has been moved to a pre-determined distance from the power unit.

5. A sprinkler system of the character set forth in claim 1 including, a valve for controlling the flow of water from said water supply to said flexible conductor, cut-off means at the power unit for actuating the valve, and means on said cable for actuating said cut-off means to stop the flow of water to said flexible conductor when said sprinkler has been moved through a predetermined distance along the selected path.

6. A sprinkler system including, a movable sprinkler, an elongate flexible water conductor connecting said sprinkler with a source of water supply, an elongate flexible cable, means secured to said cable and connecting the sprinkler to the cable, a power unit independent of the water supply having a drive pulley operatively connected with the cable for moving the cable to move the sprinkler, and a plurality of guide blocks selectively disposed at separated points in a plot to be irrigated and having horizontally disposed sheaves rotatably mounted thereon for receiving and guiding the cable to define a selected path of travel for the sprinkler, said guide blocks being removably secured in place whereby the position of said blocks may be altered as desired to change the path of travel of the sprinkler, said connecting means being movable with the cable about the sheaves, said power unit being operable independently of the water supply to move the cable to draw the sprinkler along the selected path defined by the guide blocks for irrigating the plot traversed by said path.

7. A sprinkler system including, a power unit having a drive pulley, ground anchor pins carried by the power unit for removably securing the power unit in place in a plot to be irrigated, an elongate flexible cable in the form of a continuous loop operatively connected with the drive pulley of the power unit and defining a selected irregular path traversing a plot to be irrigated, guide blocks having horizontally disposed sheaves mounted thereon for receiving and guiding the cable to define said path of travel, said guide blocks being removably secured in position at irregularly spaced points in said plot, a movable sprinkler, an elongate flexible water conductor connecting said sprinkler with a source of water supply, and means for operatively connecting the sprinkler to the flexible cable, said connecting means being movable with the cable about the sheaves whereby said cable will move the sprinkler along the selected path when the cable is moved by the power unit drive pulley.

8. A sprinkler system of the character set forth in claim 7 and including, cut-off means at the power unit operable to cut off the supply of power to the drive shaft, and means on the cable at a pre-determined point spaced from the sprinkler arranged to operatively engage said cut-off means to actuate the same to stop movement of the sprinkler when said sprinkler has been moved to a pre-determined distance from the power unit.

9. A sprinkler system including, an elongate flexible cable forming an endless loop, a movable sprinkler connected to the cable and adapted to be moved along a selected irregular path of travel defined by said flexible cable, and a power unit operatively connected with said cable for moving the cable to move the sprinkler and including, a prime mover, a drive pulley, a speed reducer interposed between the prime mover and the drive pulley for reducing the rate of movement of the drive pulley, said drive pulley having a plurality of cable receiving grooves formed in its exterior cylindrical surface, and an idler pulley disposed parallel to and spaced from said drive pulley and also having a plurality of cable receiving grooves formed in its external cylindrical surface, said grooves in the drive pulley and idler pulley being offset from each other substantially half the width of the grooves in said pulleys whereby the flexible cable may be laced alternately around the drive pulley and the idler pulley in successive grooves in said pulleys for increasing the area of contact of the cable with the pulleys and to provide for non-interfering movement of the cable past said pulleys.

10. A sprinkler system of the character set forth in claim 9 wherein, the power unit is reversible to provide for movement of the sprinkler in either direction along the path defined by the cable, and automatic cut-off means is provided at the power unit for cutting off the application of power to the cable and cutting off flow of water through the flexible conductor at pre-determined positions of the sprinkler.

11. A power unit for moving a flexible cable and including: a support; a prime mover carried by the support; a drive pulley; a speed reducer carried by the support and interposed between the prime mover and the drive pulley; said drive pulley having a plurality of spaced cable receiving annular grooves formed in its exterior cylindrical surface; and an idler pulley carried by the support and disposed parallel to and spaced from said drive pulley and also having a plurality of spaced cable receiving annular grooves formed in its exterior cylindrical surface; said grooves in the drive pulley and in the idler pulley being offset from each other substantially half the width of the grooves in said pulleys whereby the flexible cable may be laced alternately around the drive pulley and around the idler pulley in successive grooves in said pulleys for increasing the area of contact of the cable with the pulleys and to provide for non-interfering movement of the cable past said pulleys.

12. A sprinkler system including, a movable sprinkler, an elongate flexible water conductor connecting said sprinkler with a source of water supply, an elongate flexible cable connected with the sprinkler, a power unit independent of the water supply having a drive pulley operatively connected with the cable for moving the cable to move the sprinkler, a plurality of guide blocks selectively disposed at separated points in the plot to be irrigated and having horizontally disposed sheaves rotatably mounted thereon for receiving and guiding the cable to define a selected path of travel for the sprinkler, said guide blocks being removably secured in place whereby the position of said blocks may be altered as desired to change the path of travel of the sprinkler, said power unit being operable independently of the water supply to move the cable to draw the sprinkler along the selected path defined by the guide blocks for irrigating the plot traversed by said path, said guide blocks each being provided with an elongate ground pivot pin disposed eccentrically of the sheave of said block for pivotally mounting the guide blocks at selected points in the plot to be irrigated, and supporting and reinforcing sleeves pressed into the ground and having substantially vertical openings provided therein for receiving the ground pins of the guide blocks, whereby the guide blocks are removably supported by said sleeves and may be removed therefrom to permit cultivation of the plot in which the sprinkler system is installed.

JOHN B. TEMPLETON.

REFERENCES CITED

The following references are of record in the file of this patent:

UNITED STATES PATENTS

| Number | Name | Date |
|---|---|---|
| 625,920 | Ballerstedt | May 30, 1899 |
| 949,879 | Bonin | Feb. 22, 1910 |
| 992,231 | Mills | May 16, 1911 |
| 997,031 | Armstrong | July 4, 1911 |
| 1,017,578 | McMillan | Feb. 13, 1912 |
| 1,040,678 | Hine | Oct. 8, 1912 |
| 1,632,353 | Todd | June 14, 1927 |
| 1,658,202 | Jones | Feb. 7, 1928 |
| 1,661,275 | Stensland | Mar. 6, 1928 |
| 2,024,374 | Langebrake | Dec. 17, 1935 |
| 2,226,668 | Newman | Dec. 31, 1940 |

FOREIGN PATENTS

| Number | Country | Date |
|---|---|---|
| 144,509 | Switzerland | Mar. 16, 1931 |